United States Patent [19]

Doller et al.

[11] Patent Number: 4,850,464

[45] Date of Patent: Jul. 25, 1989

[54] ROLLER CLUTCH ENERGIZING SPRING WITH PROTECTED PLEATS

[75] Inventors: John S. Doller; Frederick E. Lederman, both of Sandusky, Ohio

[73] Assignee: General Motors Corporation, Detroit, Mich.

[21] Appl. No.: 239,825

[22] Filed: Sep. 2, 1988

[51] Int. Cl.⁴ .............................................. F16D 41/07
[52] U.S. Cl. ...................................... 192/45; 267/165
[58] Field of Search ...................... 192/44, 45; 267/165

[56] References Cited

U.S. PATENT DOCUMENTS

| 3,087,588 | 4/1963 | Fischer | 192/45 |
| 4,368,809 | 1/1983 | Husmann | 192/45 |
| 4,664,237 | 5/1987 | Lederman et al. | 192/45 |
| 4,679,676 | 7/1987 | King et al. | 192/45 |
| 4,711,330 | 12/1987 | Lederman | 192/45 |
| 4,724,940 | 2/1988 | Lederman | 192/45 |

FOREIGN PATENT DOCUMENTS

| 1213177 | 3/1966 | Fed. Rep. of Germany. |
| 1254916 | 11/1967 | Fed. Rep. of Germany. |
| 2846718 | 5/1979 | Fed. Rep. of Germany ........ 192/45 |

OTHER PUBLICATIONS

U.S. Ser. No. 120,413 Filed 11/13/87.

Primary Examiner—Leslie A. Braun
Assistant Examiner—David A. Testardi
Attorney, Agent, or Firm—Patrick M. Griffin

[57] ABSTRACT

An accordion type roller clutch energizing spring protects its radially directed pleats from wear against the cage side rails by taking advantage of the side thrust that occurs when a spring of that type without squared off end leaves is tipped in order to fit it into the pocket. At least one end leaf is lengthened so as to hit one side rail as the side thrust shifts the spring to the side, thereby keeping the pleats on both sides of the spring away from the side rails.

3 Claims, 6 Drawing Sheets

ROLLER CLUTCH ENERGIZING SPRING WITH PROTECTED PLEATS

This invention relates to overrunning roller clutches in general, and specifically to a roller clutch that has accordion energizing springs of the type that have radially disposed pleats that face the inner surfaces of the side rails of the clutch cage.

BACKGROUND OF THE INVENTION

While the subject invention may be described quite simply, it can best be understood if the principles, discoveries and analyses that led up to it are understood first. This requires substantial explanation of typical roller clutches and the types of springs that they currently use. Relative to this prior art:

Figure 1:
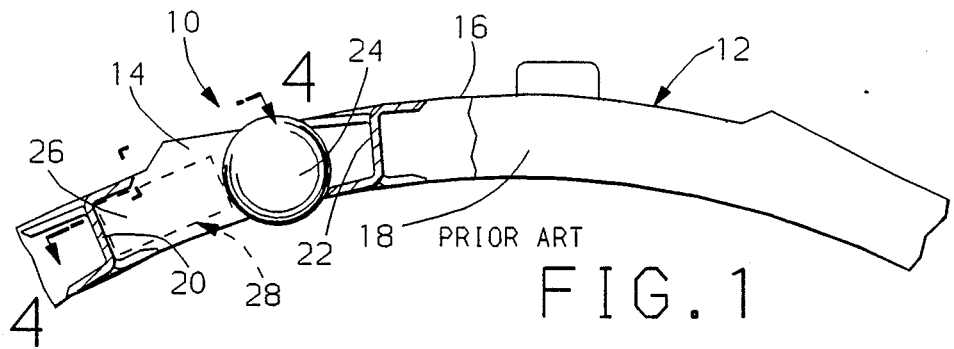
FIG. 1 shows a typical clutch cage with part of the side rail broken away to show a roller and the space where a spring would go.

Referring first to FIG. 1, roller clutches, a typical example of which is indicted generally at 10, have a generally cylindrical cage 12. Cage 12 is installed in the annular space between a pair of clutch races, not illustrated. Cage 12 usually includes a series of box shaped pockets 14 disposed circumferentially about the cage axis. Pockets 14 may be separate units linked together, or may, as in cage 12, be formed between axially spaced side rails 16 and 18 joined together by cross bars 20 and 22. Either way, the pocket is recognizable as a basic rectangle, with a generally flat base, provided here by the cross bar 20 parallel to the axis of the cage 12, and with spaced, parallel sides perpendicular to the base, provided here by the side rails 16 and 18. Each pocket 14 contains a cylindrical roller 24 which travels back and forth in the pocket, generally parallel to the base cross bar 20. As it travels, each roller 24 would be urged continually away from its pocket base 20 by an energizing spring, which is not shown in FIG. 1, but which would fit into the space indicated schematically at 26. The spring keeps roller 24 in a "ready" position, ready to jam between the races.

The energizing spring used is almost always a compression spring, and often is an accordion spring. By accordion spring, it is meant that the spring consists of a series of V shaped loops, each loop comprising a pair of flat leaves joined together at a fold or pleat. There will be two end leaves, so the number of complete loops will equal the number of leaves less one, divided by two. Since the end leaves are not joined to an adjacent leaf to make another loop, they each have a free edge. Accordion springs are installed in the pocket with their front end leaf compressed against a roller, and with their back end leaf compressed against the pocket base. Often, there is no latching structure on the spring, and it retains itself to the cage simply by the fact of its compression, although the pocket base is often U shaped in cross section, like cross bar 20 is above, so as to radially trap the back end leaf of the spring. There are two types of accordion springs, those in which the pleats are axially disposed, and so face the clutch races, and those in which the pleats are radially disposed, and so face the inner surfaces of the pocket side rails instead. As the rollers travel back and forth, the springs compress and expand, which can occur very rapidly. The pleats are crucial to the operation of the spring, being the source of the spring's resilience, and it has been recognized in the art that it is important to protect the pleats from wear against those parts of the clutch that they face.

Different approaches may be found to protecting the pleats of these two different types of accordion springs. In the case of accordion springs with axially disposed pleats, it has been proposed to provide L shaped tabs bent back from the end leaves of the springs to ride on the surfaces of the races and prevent the pleats from rubbing on the races. Examples may be seen in German Auslegeschrift Nos. 1213177 and 1254916. Likewise, in U.S. Pat. No. 3,087,588 to Fischer, assigned to the assignee of the present invention, a shelf like portion of the metal side rails hangs over the upper pleats of the spring, preventing them from rubbing on the outer race. However, spring metal would still be rubbing on cage metal, if the spring were to be thrown centrifugally outwardly. A different approach that entirely avoids the rubbing of the spring pleat on anything may be seen in U.S. Pat. No. 4,711,330 to Lederman, assigned to the assignee of the present invention, which shows a spring with axially disposed pleats in one embodiment, see FIG. 6. Tabs on the front end leaf of the spring ride on side rails of the cage, which rigorously guides the spring and keeps the pleats away from the clutch races. While the spring tabs deliberately rub on the cage side rails, the side rails are plastic, and the tabs are not a crucial, active part of the spring, as the pleats are.

In the case of accordion springs with radially disposed pleats, the problem is to prevent the pleats from rubbing on the inner surfaces of the pocket side rails. Recognition of this problem may be seen in U.S. Pat. No. 4,368,809 to Husmann, where undefined "transverse forces" are said to cause the pleats (called folds there) to butt against the side rails, where they rub and wear. Husmann's solution is to make the pleat to pleat width of the spring significantly smaller than the pocket width, and then to keep the spring centered between the side rails so that it is not physically possible for the pleats on either side of the spring to reach the side rail. Husmann centers the spring by trapping a tab bent off of the front leaf of the spring between the end of the roller and the side rail. The problem of keeping the spring from rubbing on the side rails is also recognized in U.S. Pat. No. 4,664,237 to Lederman et al, also assigned to the assignee of the present invention. There, accordion springs both with axially and radially directed pleats are shown, although the springs have two branches each. Lederman et al discloses centering either type of accordion spring by using the back end, rather than the front end of the spring. At best seen in FIG. 6, the branches of the spring are placed inboard on a spring base far enough that, when the spring base is anchored between the side rails, it is not physically possible for the outside pleats or edges of the spring to rub on the side rails. So, in both Husmann and Lederman et al, an external anchoring force is used to keep the spring away from the side rails.

An area that apparently has not received much recognition or analysis in the published prior art is the exact nature of those "transverse" forces that Husmann generally refers to above, the forces which in fact cause the pleats of an accordion spring to butt against the inner surfaces of the side rails and rub. More about the nature of these transverse forces was discovered by the current inventor in the course of modifying the way accordion springs with radial pleats are manufactured and installed. How such a spring was conventionally manufactured and installed may be seen clearly in FIG. 3 of Husmann. Note that both end leaves of the spring have been bent in to square off the spring. That same squaring off of the end leaves of a spring with radially directed pleats may be seen in U.S. Pat. No. 4,724,940 to Lederman, assigned to the assignee of the present invention, see FIG. 5. Also, in U.S. Pat. No. 4,664,237 to Lederman, noted above, the radial pleat embodiment of the double branched spring has its back end leaves, although not its front end leaves, squared off. The obvious purpose for squaring off at least the back end leaf of an accordion spring with radial pleats is to ease installation of the spring. That is, the spring will then fit squarely between the roller and the pocket base. If the end leaves were not squared of, then one would be trying to fit a spring with a rhomboid perimeter within a basically rectangular pocket, rather than fitting a rectangle within a rectangle. An incidental result of squaring off the end leaves of such a spring is that the center, active loops of the spring are thereby oriented basically symmetrically to the axis of the cage. This may be seen clearly in U.S. Pat. No. 4,664,237, FIG. 7, where the dot-dash line indicating the central plane of the spring would be square to the cage axis. However, another consequence of squaring off the end leaves of an accordion spring is that the spring is no longer totally symmetrical, as the subtended angle at the pleat of the two end loops is decreased. Since it is the pleats that create the resilience in the spring, a different angle for some or all of them leads to unbalanced stresses in the spring as it is compressed by the moving roller.

Figure 2:
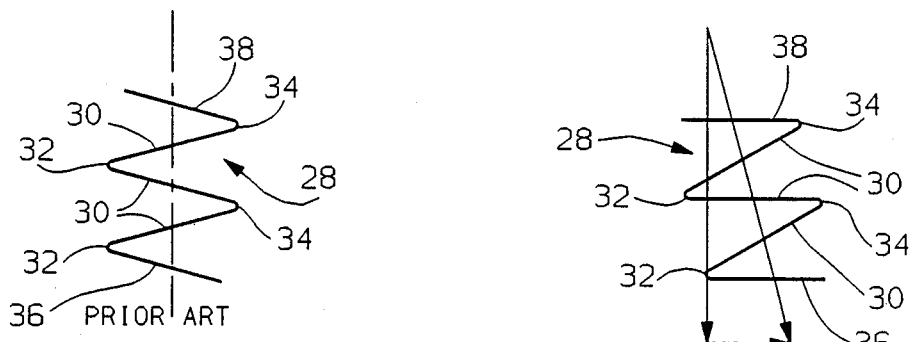
FIG. 2 shows an accordion spring of a type in which the end leaves are not squared off.
Figure 3:
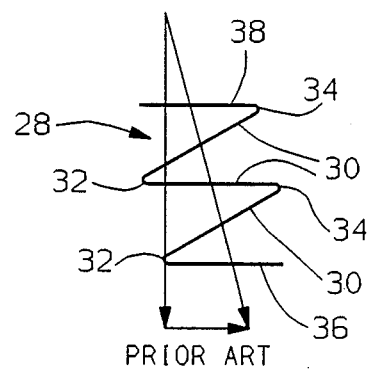
FIG. 3 shows such a spring tipped to the left prior to installation.

This realization led to the use of a modified spring, shown in FIG. 2 and indicated generally at 28. Spring 28 is an accordion spring of the type described above, and fits within the spring space 26 of cage 12. Spring 28 also has V shaped loops formed by flat leaves joined at radially disposed pleats. Specifically, spring 28 has inner leaves 30 of identical length, joined at left side pleats 32 and at right side pleats 34 to create V shaped loops. A significant difference, however, is that the back end leaf 36 and front end leaf 38 are *not* squared off. Therefore, *every* V shaped loop subtends an identical angle, and they are all symmetrically disposed about the central plane shown by the dot-dash line. Consequently, when the spring 28 is compressed, the loops formed by the leaves 30 will be stressed equally to the loops formed by the end leaves 36 and 38, unlike a conventional spring with squared off end loops. Spring 28 is also easier to manufacture, in that the squaring off is eliminated. As best seen in FIG. 3, to install spring 28 between the pocket base 20 and roller 24, it has to be first tipped or tilted to the left so that the front end leaf 38 can be placed squarely against roller 24 and so that back end leaf 36 can be placed squarely against pocket base 20. A squared off, conventional spring does not have to be tipped, of course. In tilting the spring 28 to the left, the left side pleats 32 are shifted to the left. The forwardmost part of spring 28, the free edge of the front end leaf 38, shifts the most to the left. To avoid any chance of the free edge of front end leaf 38 hitting the left hand side rail 16, both end leaves 36 and 38 are deliberately made significantly shorter than the other leaves 30. Shortening both end leaves 36 and 38 was felt to be very important, as the spring 28 could then be installed in either direction, and scraping of the front end leaf 38 free edge still avoided. So, spring 28 was easier to make, had equal stresses in all loops, and was not significantly more difficult to install as a practical matter than was a squared off spring.

Despite the advantages of spring 28, another consequence was discovered. As may be seen in FIGS. 3 through 6, when spring 28 is tipped, its loops are disposed non symmetrical to the axis of cage 12, and the central plane of spring 28, along which its compressive force acts, is not perfectly perpendicular to roller 24 or pocket base 20. Therefore, as roller 24 compresses spring 28, a component of the compressive force will act in the opposite axial direction to the direction in which spring 28 was tipped when it was installed, that is, to the right. That sideways component may be termed the side thrust. The side thrust would be reversed if spring 28 were installed and tipped the other way, which is possible, as the front and back of spring 28 are arbitrary. While the percentage of compressive force acting to the right decreases as the spring 28 compresses more, the magnitude of the force is greater.

Figure 5:
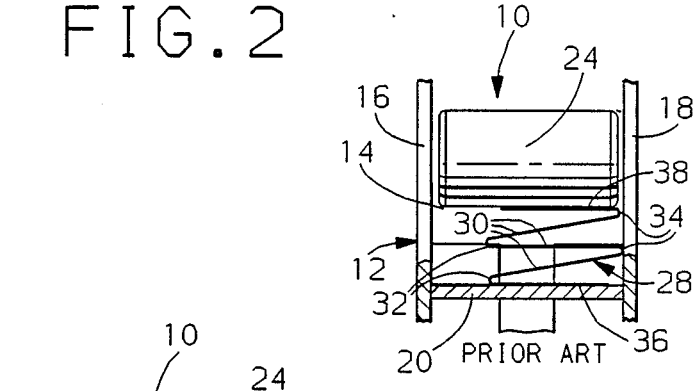
FIG. 5 shows the roller moved back to a nominal operating position of the roller, and the spring more compressed.
Figure 4:
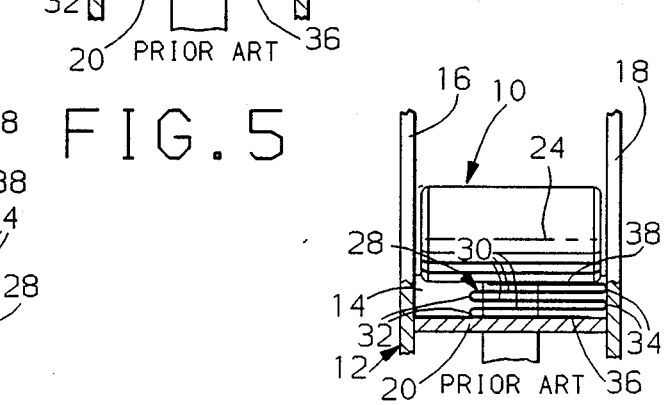
FIG. 4 shows the first embodiment installed with the roller in a shipping position.
Figure 6:
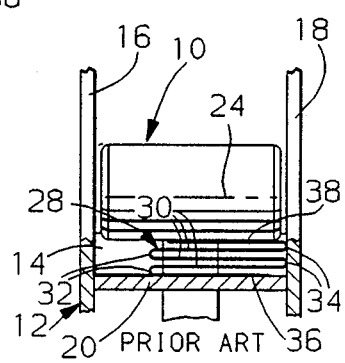
FIG. 6 shows the roller moved back to the limit, and the spring fully compressed.

Referring to FIGS. 4 through 6, as the roller moves toward the base cross bar 20, the side thrust will shift spring 28 to the right, bringing the right side pleats 34 up against the inner surface of the right side rail 18. The lower right side pleats 34 will hit first, FIG. 4, and as spring 28 compresses further, all of the right side pleats 34 will eventually hit, FIG. 6. The free edge of the back end leaf 36 will not hit at all, as it is shorter than the other leaves 30. With the right side leaves 34 kept continually against the inner surface of the right side rail 18 as the roller 24 traveled back and forth, the potential for rubbing wear can be seen. While excessive wear can be avoided by using tough spring material or plastic side rails, or both, it would be desirable to avoid the rubbing altogether, if possible.

SUMMARY OF THE INVENTION

Using the discovery and analysis of spring side thrust on a non squared off accordion spring described above, the inventors designed a spring with equal angle loops that fits into the same space and is installed in the same way, but which avoids the wear potential altogether. Unlike the loop protected springs described above, the spring disclosed is not rigidly anchored at its base or kept centered by engagement with the end of the roller. Instead, the side thrust tendency that was found to be causing the wear problem is actually used to prevent the wear problem.

The first embodiment of the spring is similar to the prior art spring described in FIG. 2, in terms of length and number of the center leaves and angles. However, contrary to the teachings of the prior art, the end leave are not shorter than the other leaves, but are in fact made deliberately longer. Then, when the spring experiences side thrust, the spring will shift to one side, for example, to the right. As the spring shifts, the left side pleats will move only farther away from the left side rail, so they will not rub. And while the right side pleats will move closer to the right side rail, they will be stopped from rubbing on the right side rail when the free edge of the longer back end leaf hits the right side rail. The side thrust will thereafter maintain the spring at an equilibrium position, with all pleats protected. The longer end leaves are kept sufficiently short that the free edge of the front end leaf will not rub on the other side rail as the roller travels, however, and a formula for optimizing the difference in length between the end leaves and the other leaves is provided.

In a second embodiment, the spring and cage are further modified to give additional advantages. Circumferentially extending slots are added to the side rails, and tabs are bent off of the free edges of the longer end leaves of the spring. When the spring is installed, the tabs snap into the slots, so the spring is positively secured to the cage. The pocket base may now be made flat, rather than U shaped, since it no longer has to help retain the spring to the cage. The tabs slide in the slots without interfering with roller travel. The spring pleats are protected from the side rails in the same way, but the spring may compress even further, all the way against the now flat pocket base.

It is, therefore, an object of the invention to protect the radially disposed pleats of a roller clutch energizing spring of the type that has all equal angle loops, without physically anchoring the spring or using any external means to keep it centered within the pocket.

It is another object of the spring to provide such a spring which has minimal modifications from a conventional spring, fits within the same space, and can be installed in the same fashion.

It is another object to use the side thrust induced on such a spring to maintain the pleats on both side of the spring spaced away from the side rails of the pocket as the roller travels.

It is yet another object of the invention to provide such a spring that is positively secured to the cage and which has an increased compression length.

DESCRIPTION OF THE PREFERRED EMBODIMENT

Figure 7:
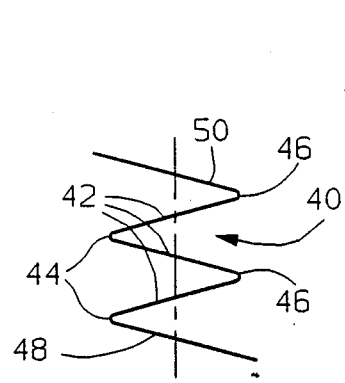
Figure 8:
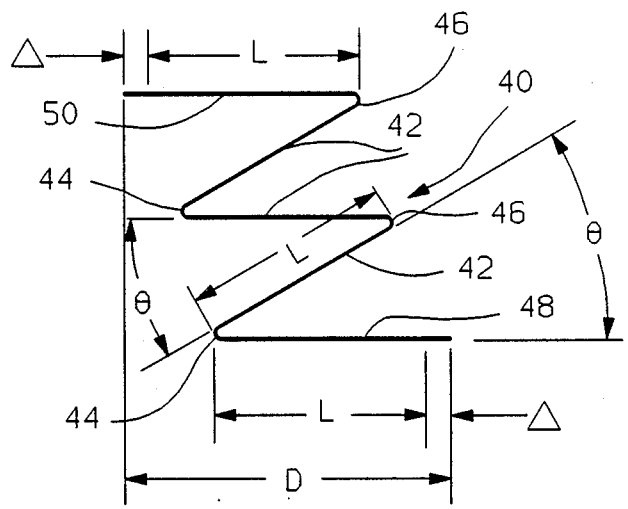
Figure 9:
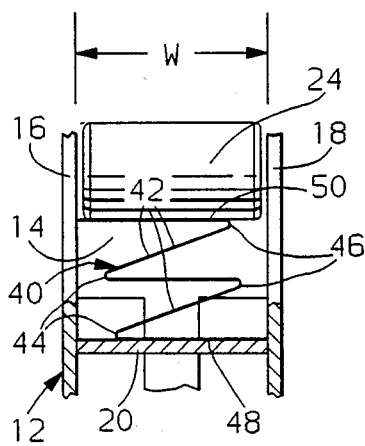
Figure 10:
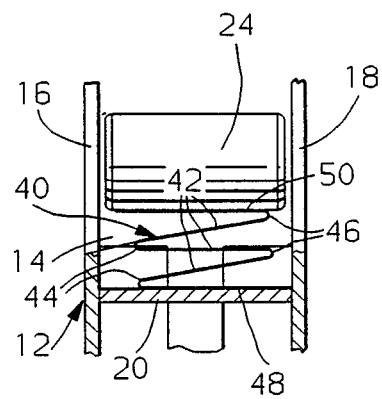
Figure 11:
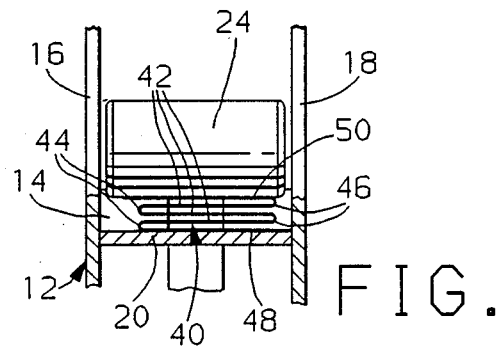
Figure 12:
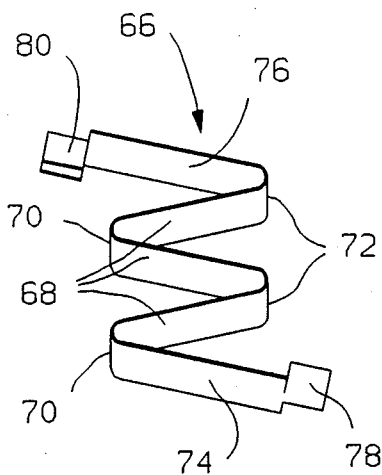
Figure 13:
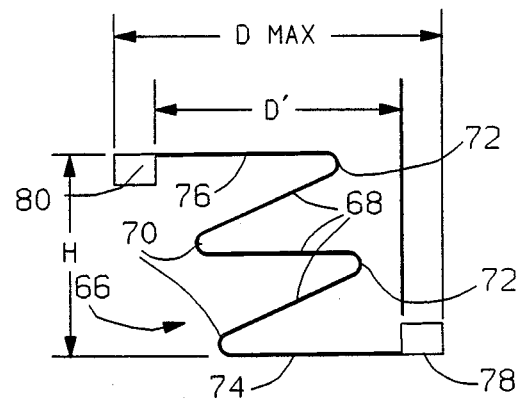
Figure 14:
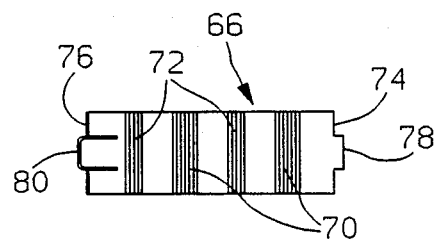
Figure 15:
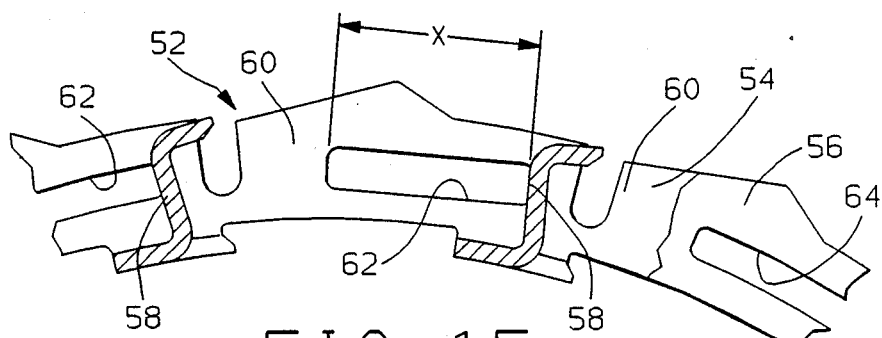
Figure 16:
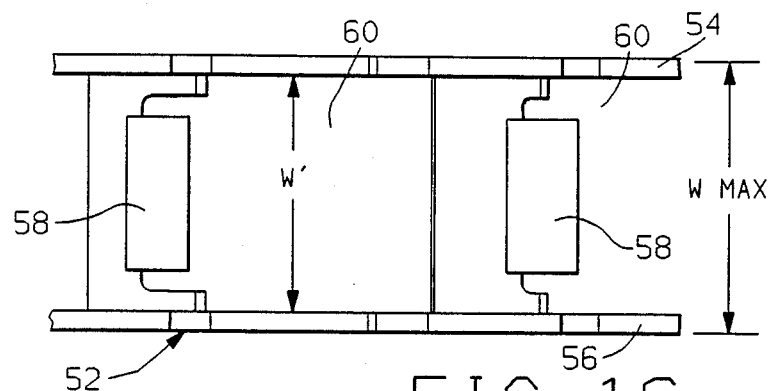
Figure 17:
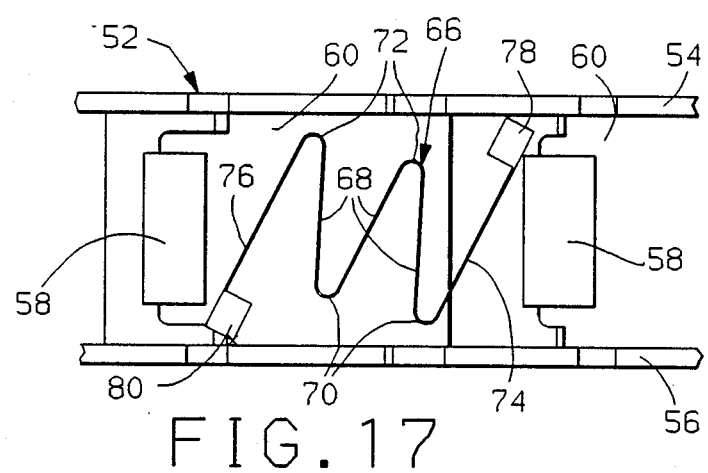
Figure 18:
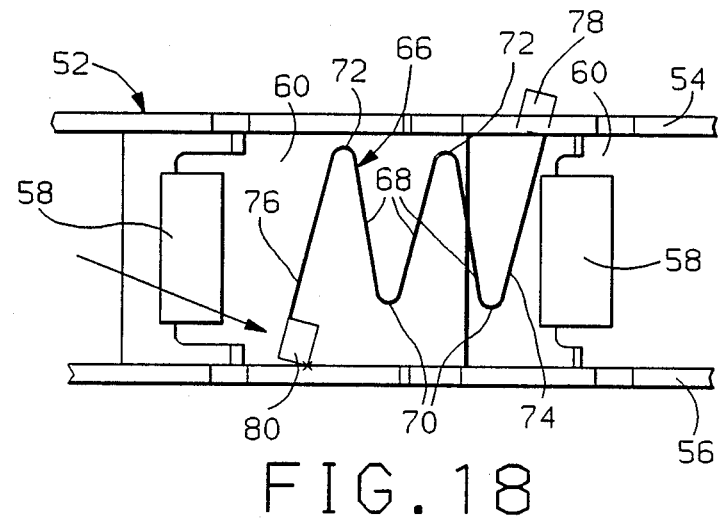
Figure 19:
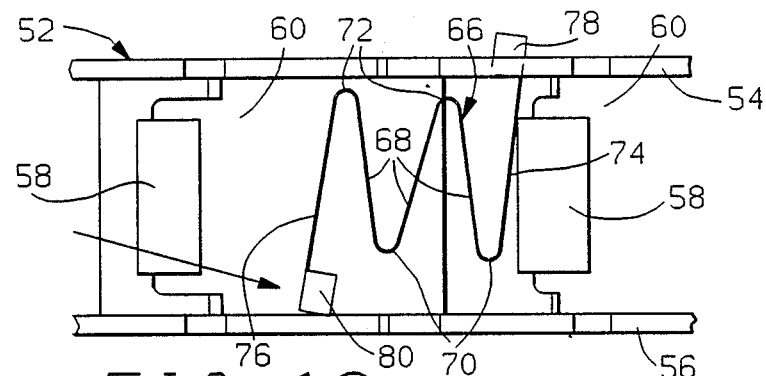
Figure 20:
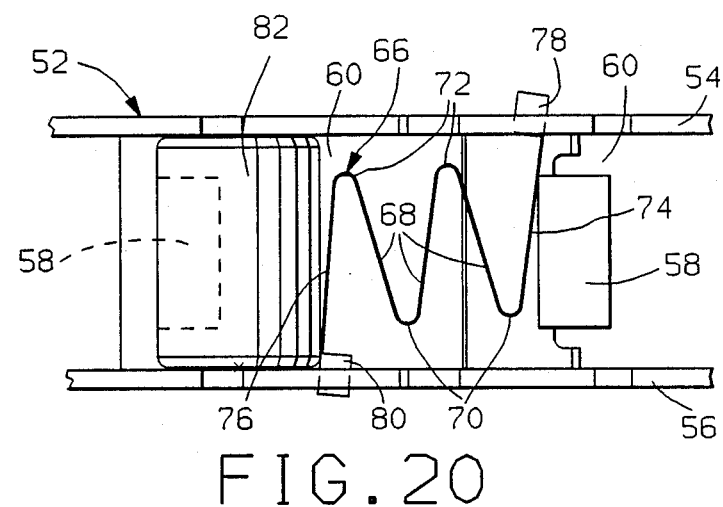
Figure 21:
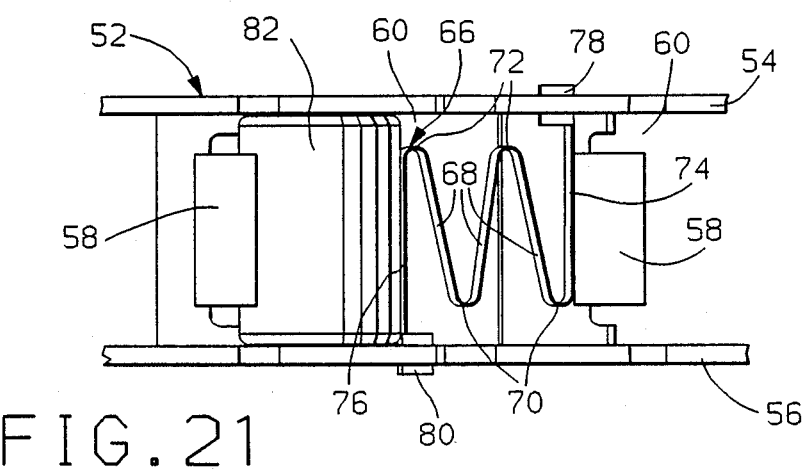
Figure 22:
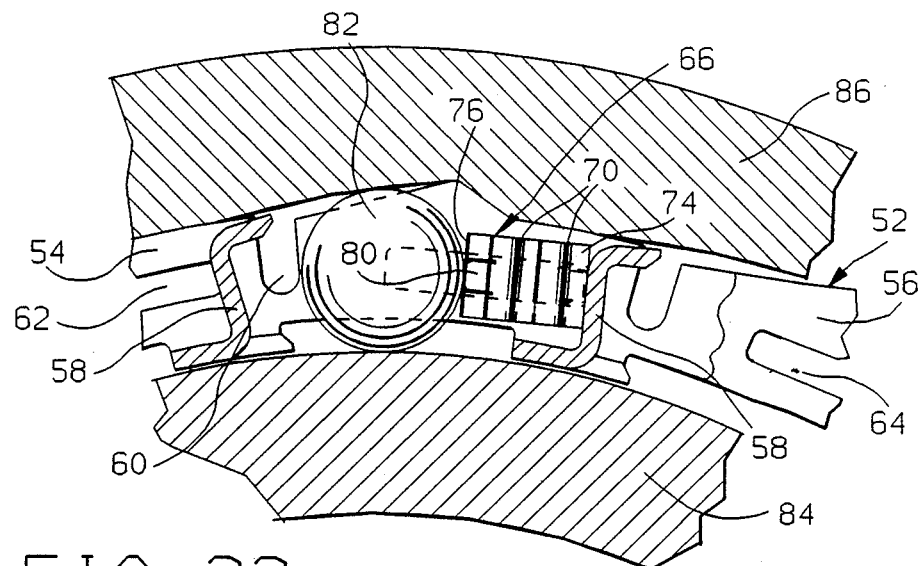
Figure 23:
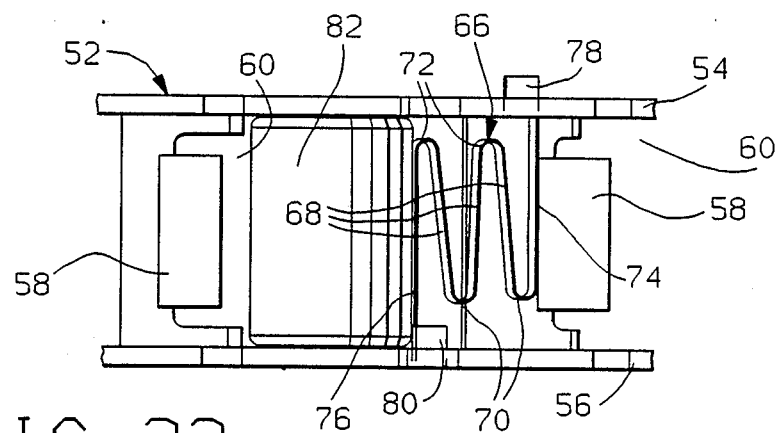
Figure 24:
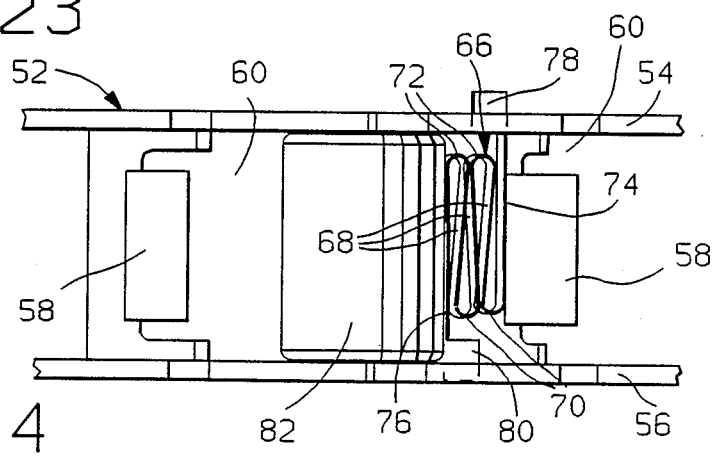

These and other objects and features of the invention will appear from the following written description, and from the drawings, in which:

FIGS. 1-6 show the prior art spring and typical cage described above;

FIG. 7 shows a first embodiment of the spring of the invention in its free state;

FIG. 8 shows the first embodiment tipped to the left prior to installation;

FIG. 9 shows the first embodiment installed and compressed slightly with the roller in a shipping position position;

FIG. 10 shows the roller moved back to a nominal operating position, and the spring further compressed;

FIG. 11 shows the roller moved back to the limit, and the spring fully compressed;

FIG. 12 is a perspective view of a the spring used in a second embodiment of the invention;

FIG. 13 is a view similar to FIG. 7, but showing the second embodiment;

FIG. 14 is a side view of the spring of the second embodiment;

FIG. 15 is a view of a portion the cage used with the second embodiment, with one side rail removed;

FIG. 16 is a view looking radially into one pocket of the cage of FIG. 15;

FIG. 17 is a view showing the spring of the second embodiment placed within a pocket preparatory to installing the spring;

FIG. 18 is a view of the spring after one tab has been pushed through one slot in one side rail;

FIG. 19 is a view of the other spring tab sliding along the other side rail toward the other slot;

FIG. 20 shows the other tab after it has snapped into the other slot, and a roller ready to be pushed into place;

FIG. 21 shows the roller pushed into place in a shipping position;

FIG. 22 shows a portion of the roller clutch of the second embodiment installed between a pair of races;

FIG. 23 is a plan view of one pocket showing the roller position of FIG. 22 and showing the spring shifted to the side;

FIG. 24 shows the roller moved back to the limit, compressing the spring fully.

Referring first to FIGS. 7 and 8, a first embodiment of the spring of the invention is indicated generally at 40, shown in a free or uncompressed state. Spring 40 is symmetrical about a central plane, which is shown as a vertical dot-dash line in FIG. 7. Spring 40 has three middle leaves 42, two left pleats 44, two right pleats 46, a back end leaf 48 and a front end leaf 50. The end leaves 48 and 50 are identical, but are numbered differently for purposes of orientation. In FIG. 8, spring 40 is shown tipped to the left far enough to bring its end leaves 48 and 50 horizontal. The middle leaves 42 have a length indicated at L, and the angle subtended between all leaves is indicated at theta. Spring 40 is identical to prior art spring 28, but for the end leaves 48 and 50. Contrary to the teachings of spring 28, the end leaves 48 and 50 are deliberately made longer that the other leaves 42, longer by a difference indicated at delta in FIG. 8. Thus, when spring 40 is tipped as shown, the free edge of the front end leaf 50 will move to the left. The free edge to free edge separation of spring 40 measured in a direction along the cage axis, which represents the spring's maximum size, is indicated at D. A simple geometrical or vector analysis of spring 40 allows D to be expressed in terms of L and theta, which is, $D = L + n \times L \times [1 - \cos(\theta)] + 2 \times \text{delta}$, where n equals the number of spring loops, two here.

Referring next to FIGS. 8 and 9, spring 40 is intended to be installed in an identical pocket 14 to energize the same roller 24 as prior art spring 28. The first step in the installation process is to tip spring 40 to the FIG. 8 orientation, just as with spring 28. Then, spring 40 is simply fitted into pocket 14, with back end leaf 48 pressed against the inner surface of base cross bar 20, and with front end leaf 50 pressed against the side of roller 24. It will be understood that since spring 40 is totally symmetrical, it could be dropped into pocket 14 in any direction, and the front, back, right and left designations are arbitrary. If D of spring 40 is set to be less than or just equal to W, spring 40 will always fit within pocket 14 without the free edge of front end leaf 50 abutting strongly with the inner surface of left side rail 16. However, it should be noted that in the embodiment disclosed, D is actually made a little larger than W. This is because, when roller 24 is at its forwardmost position of FIG. 9, spring 40 is actually compressed to a degree from its free state of FIG. 8, so that it can retain roller 24 loaded against the front cross bar 22 to retain it to cage 12. So, since the free edge of front end leaf 50 will always be shifted a bit to the left from its free state position, D may be somewhat larger than W. With roller 24 in the shipping position, the free edge of the back end leaf 48 is just abutted with the inner surface of the right side rail 18, while the free edge of the front end leaf 50 is close to or just touching the inner surface of the left side rail 16. However, if spring 40 were smaller, as it could well be, neither free edge of either end leaf 48 or 50 would necessarily be abutted with either side rail 16 or 18, at least not just after spring installation. After spring 40 is installed, both the left and right pleats 44 and 46 are spaced away from their respective left and right side rails 16 and 18. This condition is maintained as roller 24 moves, as will be next described.

Referring next to FIGS. 10 and 11, after clutch cage 12 is installed, roller 24 is shifted back closer to base cross bar 20, and spring 40 compresses more. A nominal, operating position of roller 24 is shown in FIG. 10. Because of the side thrust mechanism described in detail above, the left pleats 44 shift away from the inner surface of the left side rail 16 as spring 40 compresses. Concurrently, the right pleats shift closer to the inner surface of the right side rail 18. Because the free edge of back end leaf 48 is abutted with the inner surface of the right side rail 18, the right pleats 46 can never reach the right side rail 18 to rub on it. As seen in FIG. 11, even when roller 24 has moved back as far as it can, that is, until roller 24 hits the edges of the U shaped base cross bar 20, the right pleats 46 are still spaced well away from right side rail 18. So, the judicious lengthening of the back end leaf 48 so that it may act as a stop member, in cooperation with the internal tendency of the tipped spring 40 to shift oppositely to the direction it has been tipped, acts to keep both sets of pleats 44 and 46 continually away from the inner surfaces of both respective side rails 16 and 18 as the spring 40 compresses and expands. Therefore, rubbing wear is totally avoided.

A second embodiment of the invention provides the same benefits described above, plus the additional advantage of complete spring retention to the cage and increased maximum spring compression. Referring first to FIG. 15 and 16, a different cage, designated generally at 52, also has side rails 54 and 56, joined by cross bars 58 to create a series of box shaped pockets 60 of internal width W'. The external width of pockets 60 is indicated at Wmax. Unlike cage 12, however, cross bar 58 is S shaped, rather than U shaped. Also, unlike cage 12, the side rails 54 and 56 each have identical, axially aligned, circumferentially extending slots 62 and 64 cut through them respectively. The length of each slot 62 and 64 is indicated at X.

Referring next to FIGS. 12 through 14, the second embodiment of the spring, used with cage 52, is indicated generally at 66 in its free state. Like spring 40, spring 66 has middle leaves 68 of equal length forming equal angle loops with right and left pleats 70 and 72 respectively, and longer back and front end leaves 74 and 76. The free edge to free edge separation of the end leaves 74 and 76 in the horizontal direction, indicated at D', bears essentially the same relation to the internal width W' of pocket 60 as D to W in the first embodiment. That is, D' is substantially equal to W', although slightly less in the embodiment disclosed. It is useful also to indicate some other dimensions for spring 66. The end leaf 74 to end leaf 76 separation, which may be termed the height, is indicated at H. For the embodiment disclosed, H is greater than X, the length of the cage side rail slots 62 and 64. Unlike spring 40, spring 66 has a tab extending out from the center of the free edge of each end leaf 74 and 76, indicated at 78 and 80 respectively. Each tab 78 and 80 is U shaped in cross section, with a width just slightly less than the width of the slots 62 and 64. The tab 78 to tab 80 separation in the horizontal direction is indicted at D max. Dmax is greater than Wmax. Furthermore, the diagonal measure of spring 66 is its free state is just less than the internal diagonal measure of the inside of pocket 60.

Referring next to FIGS. 17 through 21, the relation of the various dimensions of spring 66 in its free state to the dimensions of pocket 60 allows spring 66 to be installed in pocket 60 as follows. Fist, as seen in FIG. 17, spring 66 in its free state is lain diagonally in pocket 60. Then, tab 78 is pushed through slot 62 in side rail 54, as seen in FIG. 18, and tab 80 is pushed to the right. Tab 80 then slides along the inner surface of side rail 56 as spring 66 compresses, as seen in FIG. 19. Finally, as seen in FIG. 20, the other tab 80 snaps into the other slot 64 in side rail 56. The fact that H is greater than X, and the substantially equal relation between D' and W', plus the fact that Dmax is greater than Wmax, all cooperate to keep the spring tabs 78 and 80 trapped within the cage side rail slots 62 and 64 respectively. Therefore, spring 66 is securely retained in the pocket 60, and will not fall out, an additional advantage over spring 40. Finally, a roller 82 is pushed down between the spring front end leaf 76 and cross bar 58, as seen in FIGS. 20 and 21. This compresses spring 66 somewhat from its free state, retaining roller 82 against cross bar 58. Slots 62 and 64 extend forward from each cross bar 58 toward the adjacent cross bar 58 far enough so as to not interfere with the ability of the spring 66 to retain roller 82. It should be noted in FIGS. 20 and 21 that the spring 66 is basically centered between the side rails 54 and 56, with neither free edge of either spring end leaf 74 or 76 contacting the inner surface of the respective side rails 54 and 56. Spring 66 would not have to be in this position just after installation, but certainly could be, and starting it out in that position helps to illustrate the reaction of spring 66 during later clutch operation, described next.

Referring next to FIGS. 22 through 24, clutch cage 52, along with the retained springs 66 and rollers 82, is installed by the usual ringing in method between a pair of inner and outer races 84 and 86. This moves each roller 82 back from its forwardmost position, and compresses each spring 66 somewhat, as shown in FIG. 23. As each roller 82 travels back and forth during clutch operation, spring 66 will experience the same side thrust as spring 40, and move to the side in pocket 60 until it is stopped by the engagement of the free edge of back end leaf 74 with the inner surface of side rail 54. It will be noted in FIG. 23 that spring 66 is shown shifted from its post installation position of FIG. 20. The relation between D' and W' for spring 66 and pocket 60, being basically the same as the relation between D and W for spring 40 and pocket 14 of the first embodiment, assures that the pleats 70 and 72 of spring 66 will be fully protected. As spring 66 shifts, the tabs 78 and 80 will move freely, since they do not fit tightly within the respective side rail slots 62 and 74. So, the benefit of secure spring retention is achieved without interfering with the basic protection of the spring pleats. Another advantage achieved from the way in which spring 66 is retained, as compared to spring 40, is that the inner surface of cross bar 58 may now be flat, rather than U shaped, since cross bar 58 need not help retain spring 66. Therefore, as seen in FIG. 24, roller 82 may move farther back, compressing spring 66 relatively more than spring 40 could be compressed toward the U shaped cross bar 20.

A consideration of possible variations of the first embodiment of spring 40 gives more insight into the basic nature of is operation. In the embodiment shown, because D is maximized relative to W, the free edge of back end leaf 48 starts out abutted with the inner surface of the right side rail 18. This may make it appear that end leaf 48 is, if effect, anchored or confined relative to the base cross bar 20, since it will never move relative to cross bar 20. However, end leaf 48 is actually unconfined. That this is true may be seen by considering the case where D is made considerably smaller relative to W than in spring 40, so that the free edge of the back end leaf 48 can start out spaced well away from right side rail 18 just after the installation of the spring. In that case, as the roller 24 traveled back and forth a few times, the whole spring would shift to the right, with the back end leaf sliding along the cross bar 20 to the right until its free edge finally hit the right side rail 18. After that point, the pleats would be kept continually away from the side rails 16 and 18, just as with spring 40, but the back end leaf would never have to be physically anchored to the back cross bar 20 in order to protect the loops. Furthermore, only the back end leaf need be lengthened in order to achieve that basic result. However, such a spring would not be symmetrical, and its installation would require a deliberate orienting on the part of the installer, a definite practical drawback. Still, the consideration of avoiding wear of the free edge of the front end leaf against its side rail that dictated the shortening of the end leaves of the prior art spring 28 still applies. A designer may alter a conventional spring like spring 28 to create a spring like 40 by equally lengthening each end leaf. Using the formula provided above, and substituting W for D, one can determine how far to lengthen each end leaf by calculating delta in terms of L, theta, and W, for a given spring and given pocket. A completely symmetrical spring is thus achieved without causing scraping of the front end leaf's free edge. Stated generally, lengthening the back end leaf at all keeps the spring pleats away from the side rails and prevents pleat wear, while lengthening both end pleats, within the maximum limit for delta, also provides a symmetrical spring that will not scrape at the front free edge. Therefore, it will be understood that the invention is not intended to be limited to just the embodiments disclosed.

The embodiments of the invention in which an exclusive property or privilege is claimed are defined as follows:

1. A roller energizing spring for an overrunning roller clutch of the type that has a generally cylindrical cage with a central axis and a series of generally box shaped roller pockets disposed circumferentially about said central axis, each of which pockets has a flat base lying in a plane generally parallel to said axis and a pair of side rails extending from said base with parallel inner surfaces between which a cylindrical roller disposed generally parallel to said base moves back and forth, said spring comprising, a series of flat leaves with all but the end leaves being joined to an adjacent leaf at a pleat so as to create a series of V shaped loops with pleats located on each side of said spring, said end leaves each having one free edge, each loop also having an identical angle subtended between its leaves, so that, when said spring is installed in said pocket with a front end leaf against said roller and a back end leaf against said pocket base, said spring loops are thereby tipped in one direction relative to said cage axis so that compression of said spring by said roller as it moves will induce a side thrust on said roller in the opposite direction that will shift said spring to one side and move the pleats on one spring side toward the inner surface of one side rail, said spring back end leaf further being longer than the other spring leaves such that, when said roller moves and said spring side thrust is induced, the free edge of said back end leaf will contact said one side rail inner surface and prevent the pleats on said one spring side from contacting said one side rail as said roller moves.

2. A roller energizing spring for an overrunning roller clutch of the type that has a generally cylindrical cage with a central axis and a series of generally box shaped roller pockets disposed circumferentially about said central axis, each of which pockets has a flat base lying in a plane generally parallel to said axis and a pair of side rails extending from said base with parallel inner surfaces between which a cylindrical roller disposed generally parallel to said base moves back and forth, said spring comprising, a series of flat leaves with all but the end leaves being joined to an adjacent leaf at a pleat so as to create a series of V shaped loops with pleats located on each side of said spring, said end leaves each having one free edge, each loop also having an identical angle subtended between its leaves, so that, when said spring is installed in said pocket with one end leaf against said pocket base and the other end leaf against said roller, said spring loops are thereby tipped in one direction relative to said cage axis so that compression of said spring by said roller as it moves will induce a side thrust on said roller in the opposite direction that will shift said spring to one side and move the pleats on one spring side toward the inner surface of one side rail, said spring end leaves further being longer than the other spring leaves such that, when said roller moves and said spring side thrust is induced, the free edge of said one end leaf will contact said one side rail inner surface and prevent the pleats on said one spring side from contacting said one side rail as said roller moves, said end leaves further being sufficiently short such that the free edge of said other end leaf will not scrape against the inner surface of the other side rail as said roller moves.

3. An overrunning clutch, comprising, a generally cylindrical cage with a central axis and a series of generally box shaped roller pockets disposed circumferentially about said central axis, each of which pockets has a flat base lying in a plane generally parallel to said axis and a pair of side rails extending from said base with parallel inner surfaces, each of said pocket side rails also having a circumferentially extending slot therethrough, a series of cylindrical rollers, each of which is disposed in a respective pocket generally parallel to said pocket base so as to move back and forth relative to said pocket base, a series of springs, one within each pocket, each of said springs comprising a series of flat leaves with all but the end leaves being joined to an adjacent leaf at a pleat so as to create a series of V shaped loops with pleats located on each side of said spring, said end leaves of each spring each having one free edge, each loop also having an identical angle subtended between its leaves, so that, when each spring is installed in its pocket with one end leaf against said pocket base and the other end leaf against said roller, said spring loops are thereby tipped in one direction relative to said cage axis so that compression of said spring by said roller as it moves will induce a side thrust on said spring in the opposite direction, which will shift said spring to one side and move the pleats on one spring side toward the inner surface of one side rail, said spring end leaves further being longer than the other spring leaves and each having a tab extending axially outwardly from said free edge that fits within a respective side rail slot, whereby, each spring is retained in its pocket, and when said roller moves, said tabs slide back and forth in said side rail slots with the spring side thrust induced on each spring shifting said spring toward said one side rail and moving said tabs freely through said slots until the free edge of said one end leaf contacts said one side rail inner surface and stops said spring from shifting farther, thereby preventing the pleats on said one spring side from contacting said one side rail as said roller moves, each end leaf further being sufficiently short such that the free edge of said other end leaf will not scrape against the inner surface of the other side rail as said roller moves.

* * * * *